(12) United States Patent
Bae

(10) Patent No.: US 7,616,236 B2
(45) Date of Patent: Nov. 10, 2009

(54) CONTROL METHOD USED BY DIGITAL IMAGE PROCESSING APPARATUS

(75) Inventor: Sung-cheol Bae, Seongnam-si (KR)

(73) Assignee: Samsung Digital Imaging Co., Ltd., Suwon-si (KR)

( * ) Notice: Subject to any disclaimer, the term of this patent is extended or adjusted under 35 U.S.C. 154(b) by 622 days.

(21) Appl. No.: 11/247,940

(22) Filed: Oct. 11, 2005

(65) Prior Publication Data

US 2006/0262203 A1    Nov. 23, 2006

(30) Foreign Application Priority Data

May 18, 2005    (KR) ...................... 10-2005-0041658

(51) Int. Cl.
*H04N 5/262* (2006.01)
(52) U.S. Cl. .............................. 348/240.99; 348/222.1; 348/231.99
(58) Field of Classification Search ............. 348/222.1, 348/231.99, 240.1–99
See application file for complete search history.

(56) References Cited

U.S. PATENT DOCUMENTS

| | | | | |
|---|---|---|---|---|
| 5,812,189 | A * | 9/1998 | Kimura et al. | 348/240.99 |
| 7,388,607 | B2 * | 6/2008 | Nakahira | 348/240.2 |
| 2003/0222988 | A1 * | 12/2003 | Koreki et al. | 348/207.99 |
| 2004/0218738 | A1 * | 11/2004 | Arai et al. | 379/93.17 |
| 2005/0094000 | A1 * | 5/2005 | Son et al. | 348/231.99 |
| 2006/0077263 | A1 * | 4/2006 | Hosoda | 348/222.1 |
| 2006/0164519 | A1 * | 7/2006 | Kaku | 348/222.1 |

FOREIGN PATENT DOCUMENTS

| | | |
|---|---|---|
| CN | 1612030 A | 5/2005 |
| JP | 2003-348434 A | 12/2003 |

\* cited by examiner

*Primary Examiner*—Lin Ye
*Assistant Examiner*—Gevell Selby
(74) *Attorney, Agent, or Firm*—Drinker Biddle & Reath LLP

(57) ABSTRACT

Provided is a control method used by a digital image processing apparatus, and more particularly, to a control method used by a digital image processing apparatus that records motion image data in a recording medium in a motion image photographing mode. The method includes (a) creating a motion image file in the recording medium and storing the motion image data in the motion image file in response to a first signal generated when a user presses a first button on the digital image processing apparatus; (b) temporarily stopping storing the motion image data in response to the first signal generated when the user presses a second button on the digital image processing apparatus; (c) zooming a zoom lens in response to a predetermined signal generated when the user presses a button for changing an angle of view; (d) continuing to store the motion image data input to the changed zooming position in the motion image file in response to a second signal generated when the user presses the second button; and (e) terminating storing of the motion image data and completing the motion image file in response to the second signal generated when the user presses the first button.

19 Claims, 12 Drawing Sheets

CONTROL METHOD USED BY DIGITAL IMAGE PROCESSING APPARATUS

This application claims the priority of Korean Patent Application No. 10-2005-0041658, filed on May 18, 2005, in the Korean Intellectual Property Office, the disclosure of which is incorporated herein in its entirety by reference.

BACKGROUND OF THE INVENTION

1. Field of the Invention

The present invention relates to a control method used by a digital image processing apparatus, and more particularly, to a control method used by a digital image processing apparatus that records motion image data in a recording medium in a motion image photographing mode.

2. Description of the Related Art

Conventional digital image processing apparatuses operate in a motion image photographing mode as follows. When a user presses a button, for example, a shutter release button, on a digital image processing apparatus, a motion image file is created in a recording medium. Then, motion image data is processed and stored in the motion image file. When the user presses the button again, the motion image data stops being stored, and the motion image file is set.

In the motion image photographing mode, some conventional digital image processing apparatuses provide an optical zoom function while the others provide an electronic zoom function. The optical zoom function refers to enlarging or reducing an image by moving a plurality of lenses and then displaying the enlarged or reduced image on a charge coupled device (CCD), whereas the electronic zoom function refers to enlarging or reducing an image recorded on the CCD.

In an electronic zoom operation, an image can be enlarged, but the resolution of the image deteriorates. Recently, the optical zoom function has been added to digital image processing apparatuses already providing the electronic zoom function such that the digital image processing apparatuses can enlarge images, utilizing the optical zoom, without compromising the resolution of the images.

In an optical zoom operation, an image can be adjusted to have a desired size by continuously changing a focal distance within a predetermined range using a zoom lens. However, when the optical zoom operation is performed, the noise of a motor zooming the zoom lens is recorded together with motion images by a voice recording unit of the digital image processing apparatus. Thus, when the motion images are reproduced, they are accompanied by a lot of noise. In this regard, it is difficult to apply the optical zoom function to the digital image processing apparatuses providing the electronic zoom function.

SUMMARY OF THE INVENTION

The present invention provides a control method used by a digital image processing apparatus, in which noise generated by the digital image processing apparatus during an optical zoom operation can be prevented from being recorded together with motion images, and motion images with various angles of view can be stored.

According to an aspect of the present invention, there is provided a control method used by a digital image processing apparatus that records motion image data in a recording medium. The method may include: (a) creating a motion image file in the recording medium and storing the motion image data in the motion file in response to a first signal generated when a user presses a first button on the digital image processing apparatus; (b) temporarily stopping storing the motion image data in response to the first signal generated when the user presses a second button on the digital image processing apparatus; (c) zooming a zoom lens in response to a predetermined signal generated when the user presses a button for changing an angle of view; (d) continuing to store the motion image data to the motion image file when zooming stops in response to a second signal generated when the user presses the second button; and (e) terminating storing of the motion image data and completing the motion image file in response to the second signal generated when the user presses the first button.

According to another aspect of the present invention, there is provided a control method used by a digital image processing apparatus that records motion image data in a recording medium. The method may include: (a) creating a motion image file in the recording medium and storing the motion image data in the motion image file in response to a first signal generated when a user presses a first button on the digital image processing apparatus; (b) temporarily stopping storing the motion image data in response to a predetermined signal generated when the user presses a button for changing an angle of view; (c) zooming a zoom lens in response to the predetermined signal; (d) continuing to store the motion image data to the motion image file when zooming stops; and (e) terminating storing of the motion image data and completing the motion image file in response to a second signal generated when the user presses the first button.

According to another aspect of the present invention, there is provided a control method used by a digital image processing apparatus that records motion image data in a recording medium. The method may include: (a) creating a motion image file in the recording medium and storing the motion image data in the motion image file in response to a first signal generated when a user presses a first button on the digital image processing apparatus; (b) continuing to store the motion image data while enlarging or reducing a portion of a motion image through a charge coupled device (CCD) in response to a predetermined signal generated when the user presses a button for changing an angle of view; (c) temporarily stopping storing the motion image data in response to the first signal generated when the user presses a second button on the digital image processing apparatus; (d) zooming a zoom lens in response to the predetermined signal; (e) continuing to store the motion image data to the motion image file when zooming stops in response to a second signal generated when the user presses the second button; and (f) terminating storing of the motion image data and completing the motion image file in response to the second signal generated when the user presses the first button.

According to another aspect of the present invention, there is provided a control method used by a digital image processing apparatus that records motion image data in a recording medium. The method may include: (a) creating a motion image file in the recording medium and storing the motion image data in the motion image file in response to a first signal generated when a user presses a first button on the digital image processing apparatus; (b) continuing to store the motion image data while enlarging or reducing a portion of a motion image through a photoelectric conversion unit (OEC) in response to a predetermined signal generated when the user presses a button for changing an angle of view; (c) temporarily stopping storing the motion image data in response to the first signal generated when the user presses a second button on the digital image processing apparatus; (d) initializing the angle of view changed in operation (b) and zooming a zoom lens in response to the predetermined signal generated when the user presses the button for changing the angle of view; (e) continuing to store the motion image data to the motion image file when zooming stops in response to a second signal generated when the user presses the second button; and (f) terminating storing of the motion image data and completing the motion image file in response to the second signal generated when the user presses the first button.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
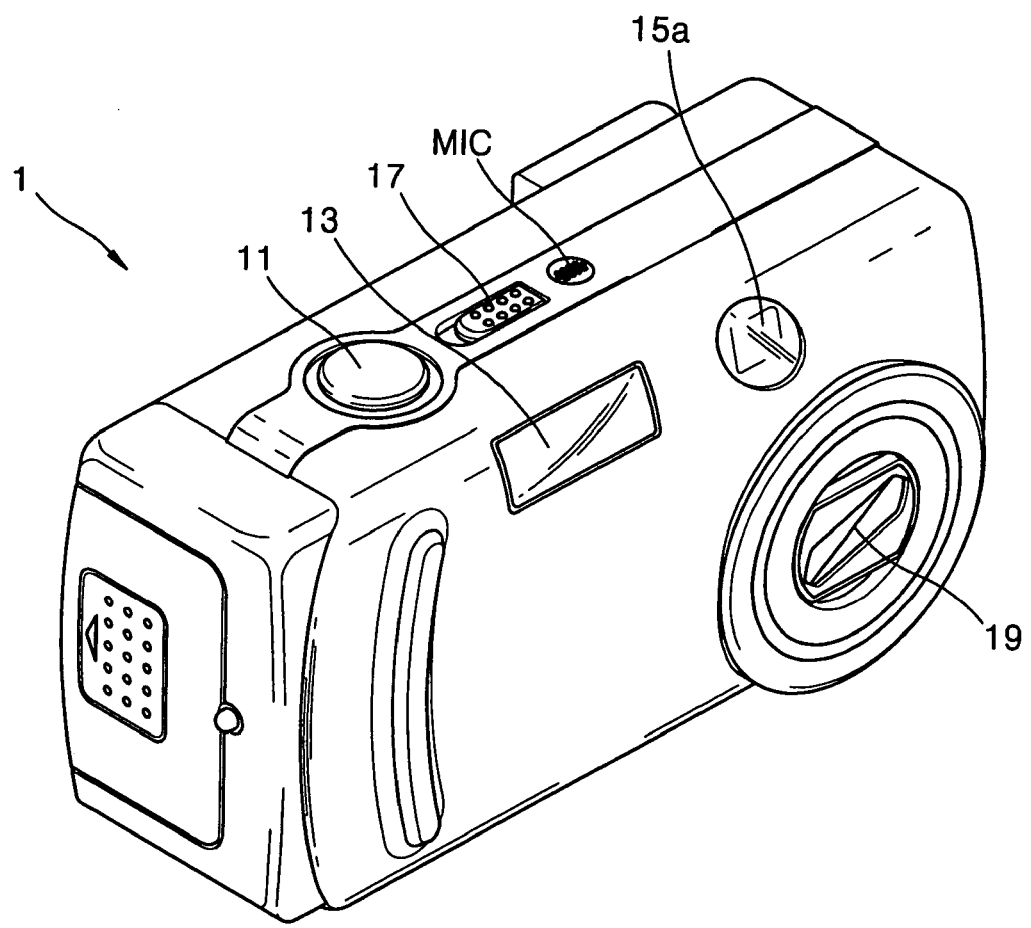
FIG. 1 is a perspective view illustrating the front and top of a digital camera according to an embodiment of the present invention.

Referring to FIG. 1, the front part of a digital camera 1 as a digital image processing apparatus according to the present invention includes a microphone MIC, a shutter release button 11, a flash 13, an object lens 15a of a viewfinder, a power switch 17, and a lens unit 19.

The shutter release button 11 is opened and closed to expose a charge coupled device (CCD) or a film to light for a predetermined period of time. Linked with an aperture (not shown), the shutter release button 11 exposes a subject appropriately and records an image on the CCD.

The flash 13 momentarily shines a sudden bright light when a picture is taken in a dark place. A flash mode includes automatic flash, forced light emission, emission prohibition, red-eye reduction, and slow synchronization modes.

The object lens 15a of the viewfinder is a small window on the digital camera 1 for viewing a subject and setting composition. Some digital cameras employ a liquid crystal screen instead of an optical viewfinder.

Figure 2:
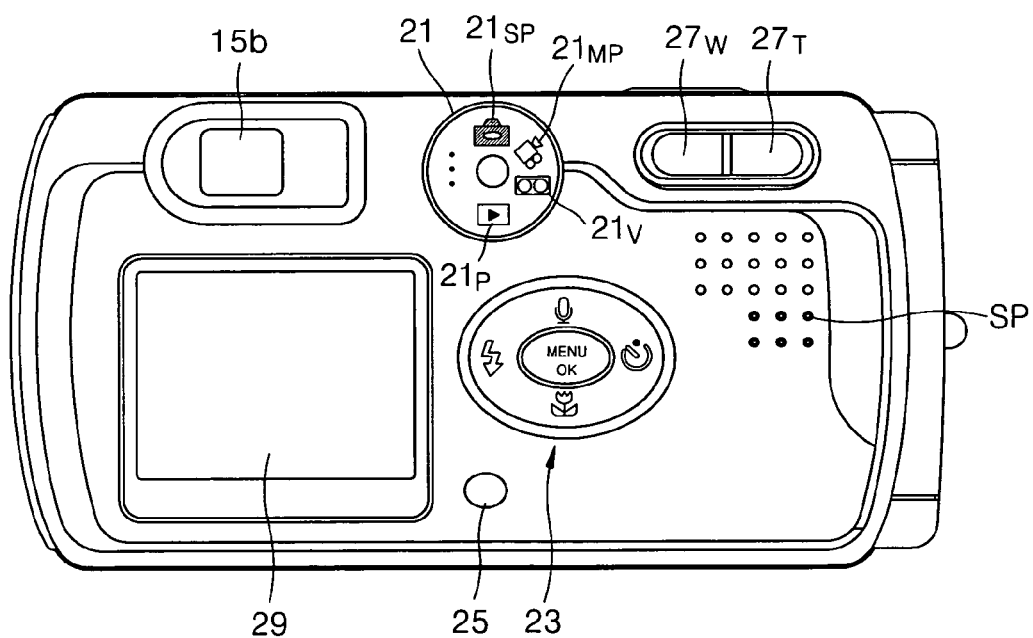
FIG. 2 is a back view of the digital camera of FIG. 1.

Referring to FIG. 2, the back of the digital camera 1 includes an ocular lens 15b of a viewfinder, a mode dial 21, functional buttons 23, a pause/continue button 25, a wide-angle zoom button $27_W$, a telephoto-zoom button $27_T$, a color LCD panel 29, and a speaker SP.

The mode dial 21 is used for selecting any one of operating modes of the digital camera 1, such as a still-image photographing mode $21_{SP}$, a motion image photographing mode $21_{MP}$, a recording mode $21_V$, and a reproducing mode $21_P$.

After selecting the still-image photographing mode $21_{SP}$ using the mode dial 21, when a user presses the shutter release button 11, a still-image file is created and stored in a memory card, i.e., a recording medium.

After selecting the motion image photographing mode $21_{MP}$ using the mode dial 21, when the user presses the shutter release button 11 (S1), a motion image file is created and stored in the memory card, i.e., the recording medium, and motion image data is stored in the motion image file. When the user presses the shutter release button 11 again (S2), the motion image data stops being stored and the motion image file is set.

After selecting the recording mode $21_V$ using the mode dial 21, when the user presses the shutter release button 11 (S1), audio data is recorded for a recordable period of time. When the user presses the shutter release button 13 again (S2) while the audio data is being recorded, the audio data stops being recorded.

After selecting the reproducing mode $21_P$ using the mode dial 21, when the user presses a corresponding one of the functional buttons 23, the still image, the motion image, and the audio data stored in the memory can be reproduced.

The functional buttons 23 are used for operating specific functions of the digital camera 1 and also used as control buttons to manage the movement of an active cursor on a menu screen of the color LCD panel 29.

The pause/continue button 25 is used for temporarily stopping photographing a motion image or continuously storing motion image data in the motion image photographing mode $21_{MP}$. While photographing the motion image, when the user presses the pause/continue button 25 (P1), the motion image data stops being stored temporarily. When the user presses the pause/continue button 25 again (P2), the input motion image data continues to be stored.

Figure 3:
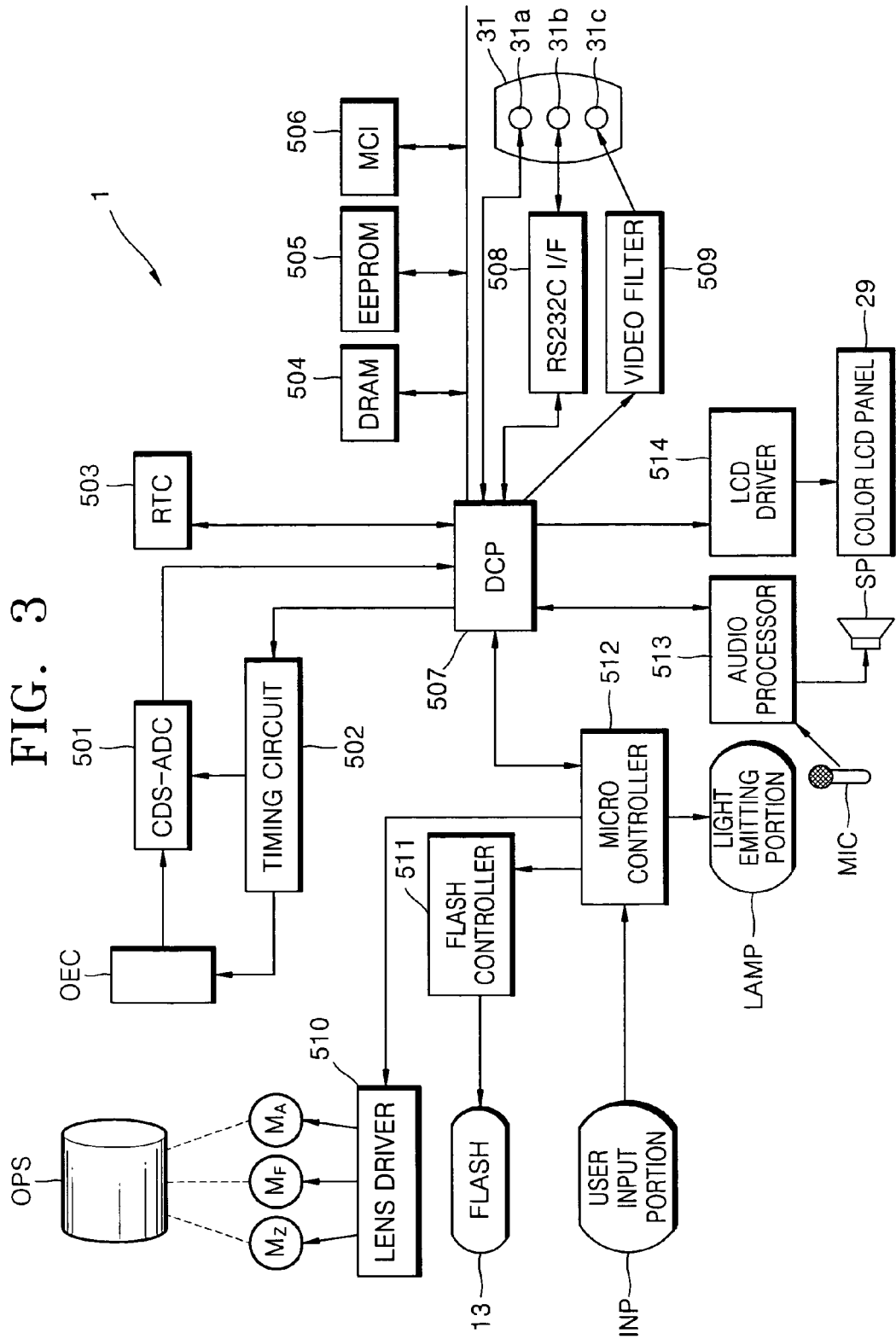
FIG. 3 is a block diagram of the digital camera of FIG. 1.

FIG. 3 is a block diagram of the digital camera 1 of FIG. 1. The entire configuration and operation of the digital camera 1 of FIG. 1 will now be described with reference to FIGS. 1 through 3.

An optical system (OPS) including a lens unit and a filter unit optically processes light from a subject. The lens unit of the OPS includes a zoom lens, a focus lens, and a compensation lens.

The wide angle-zoom button $27_W$ or the telephoto-zoom button $27_T$ is used to change the angle of view. When the user presses the wide angle-zoom button $27_W$ or the telephoto-zoom button $27_T$ included in a user input portion (INP), a signal corresponding to the wide angle-zoom button $27_W$ or the telephoto-zoom button $27_T$ is relayed to a micro-controller 512. The micro-controller 512 controls a lens driver 510, thereby running a zoom motor $M_Z$, which in turn, moves the zoom lens. In other words, when the user presses the wide angle-zoom button $27_W$, the focal length of the zoom lens becomes short, thereby widening the angle of view. When the user presses the telephoto-zoom button $27_T$, the focal length of the zoom lens becomes long, thereby narrowing the angle of view. Since the position of the focus lens is adjusted in a state where the position of the zoom lens is set, the angle of view is hardly affected by the position of the focus lens.

In an automatic focusing mode, a main controller built into a digital signal processor (DSP) 507 controls the lens driver 510 through the micro-controller 512, thereby driving a focus motor $M_F$. Accordingly, when the focal lens is moved, a number of driving steps of the focus motor $M_F$, having a largest high frequency component of an image signal is set.

The compensation lens in the lens unit of the OPS is not separately operated because the compensation lens compensates for the entire refractive index. Reference numeral $M_A$ indicates a motor for driving the aperture (not shown).

An optical low pass filter included in the filter unit of the OPS eliminates high frequency optical noise. An infrared cut filter included in the filter unit of the OPS blocks the infrared component of incident light.

A photoelectric conversion unit (OEC) of a charge coupled device or a complementary metal oxide (CMOS) semiconductor converts light from the OPS into an analog electrical signal. Here, the DSP 507 controls a timing circuit 502 to control the operations of the OEC and a correlation-double-sampler-and-analog-to-digital converter (CDS-ADC) 501. The CDS-ADC 501 processes an analog signal from the OEC, eliminates high frequency noise therefrom, adjusts an amplitude thereof, and then converts the analog signal into a digital signal.

A real time clock (RTC) 503 provides time information to the DSP 507. The DSP 507 processes the digital signal from the CDS-ADC 501 and generates a digital image composed of luminance and chromaticity values.

A light emitting portion (LAMP) is operated by the micro-controller 512 in response to a control signal generated by the DSP 507 including the main controller. The light emitting portion (LAMP) includes a self-timer lamp (not shown), an automatic focusing lamp (not shown), a mode indicating lamp (not shown), and a flash standby lamp (not shown).

The user input portion INP includes the shutter release button 11, the mode dial 21, the functional buttons 23, the pause/continue button 25, the wide angle-zoom button $27_W$, and the telephoto-zoom button $27_T$.

A dynamic random access memory (DRAM) 504 temporarily stores a digital image signal from the DSP 507. An electrically erasable and programmable read only memory (EEPROM) 505 stores algorithms and setting data required to operate the DSP 507. A user's memory card is inserted into or removed from a memory card interface 506. The digital image signal from the DSP 507 is input to an LCD driver 514, thereby displaying an image on the color LCD panel 29.

The digital image signal from the DSP 507 can be transmitted via a universal serial bus (USB) connector 31$a$ or via an RS232C interface 508 and an RS232C connector 31$b$ for serial communications. The digital image signal from the DSP 507 can also be transmitted via a video filter 509 and a video output unit 31$c$ as a video signal.

An audio processor 513 outputs an audio signal from the microphone MIC to the DSP 507 or to speaker SP and outputs an audio signal from the DSP 507 to the speaker SP. The micro-controller 512 controls the operation of a flash controller 511 in response to a signal from a flash-luminance sensor (not shown), thereby driving the flash 12.

A control method used by the digital camera 1 has four embodiments. According to a first embodiment illustrated in FIGS. 4 and 5, the pause/continue button 25 is used to perform an optical zoom operation when a motion image photographing operation is temporarily stopped in the motion image photographing mode $21_{MP}$ so as to obtain images with various angles of view.

Figure 6:
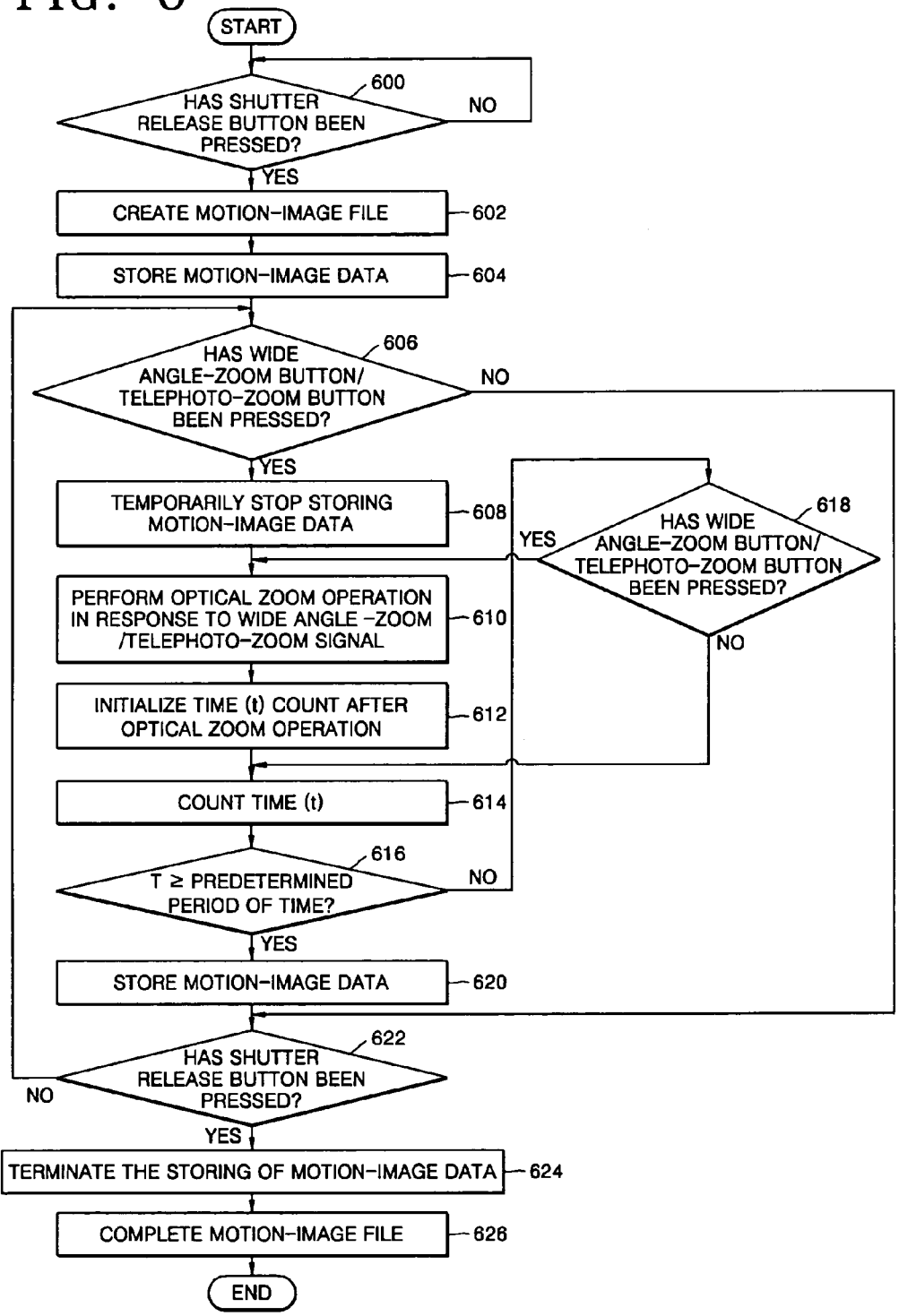
FIG. 6 is a flowchart illustrating a control method used by the digital camera according to a second embodiment of the present invention.
Figure 7:
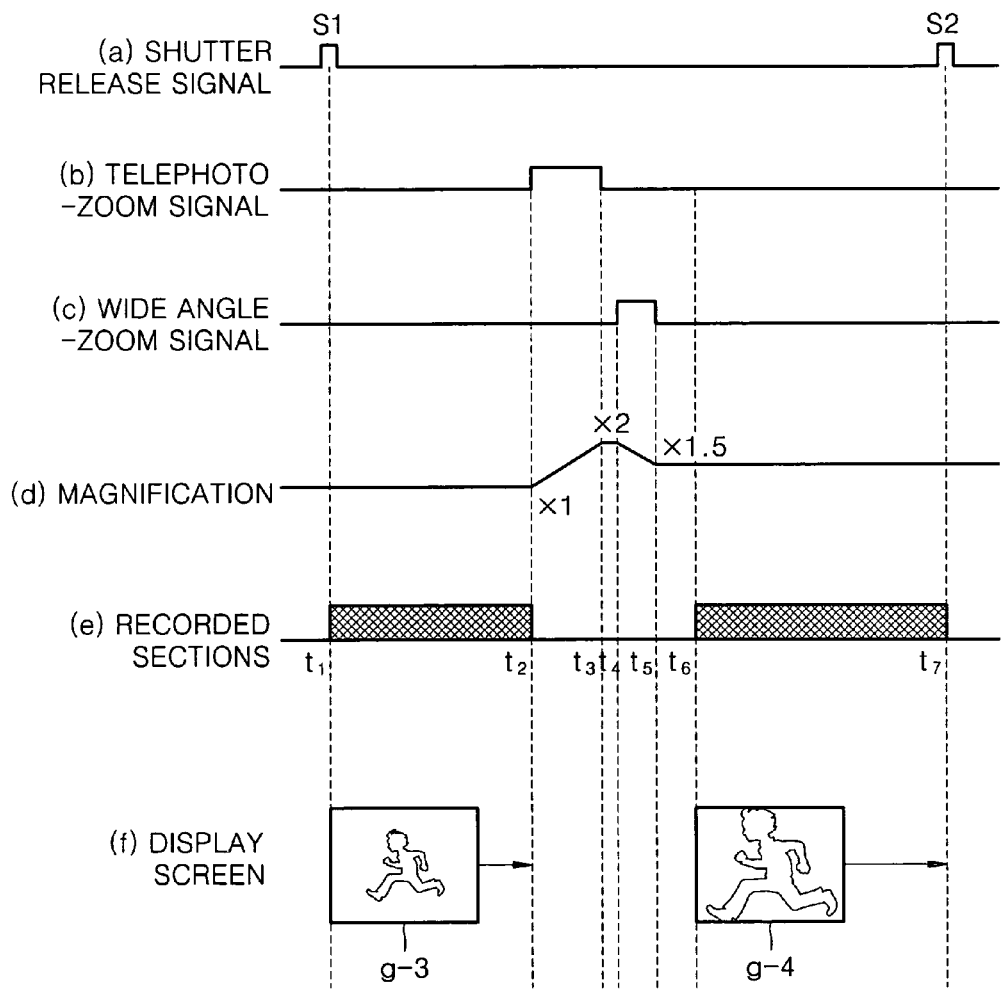
FIG. 7 illustrates timing diagrams and display screens for illustrating the method of FIG. 6 in more detail.

According to a second embodiment illustrated in FIGS. 6 and 7, in the motion image photographing mode $21_{MP}$, when the wide angle-zoom button $27_W$ or the telephoto-zoom button $27_T$ is pressed, motion image data temporarily stops being stored and the optical zoom operation is performed in response to a wide angle-zoom signal or a telephoto-zoom signal. If the wide angle-zoom button $27_W$ or the telephoto-zoom button $27_T$ is not pressed for a predetermined period of time, the motion image data resumes being stored to complete an image.

Figure 8:
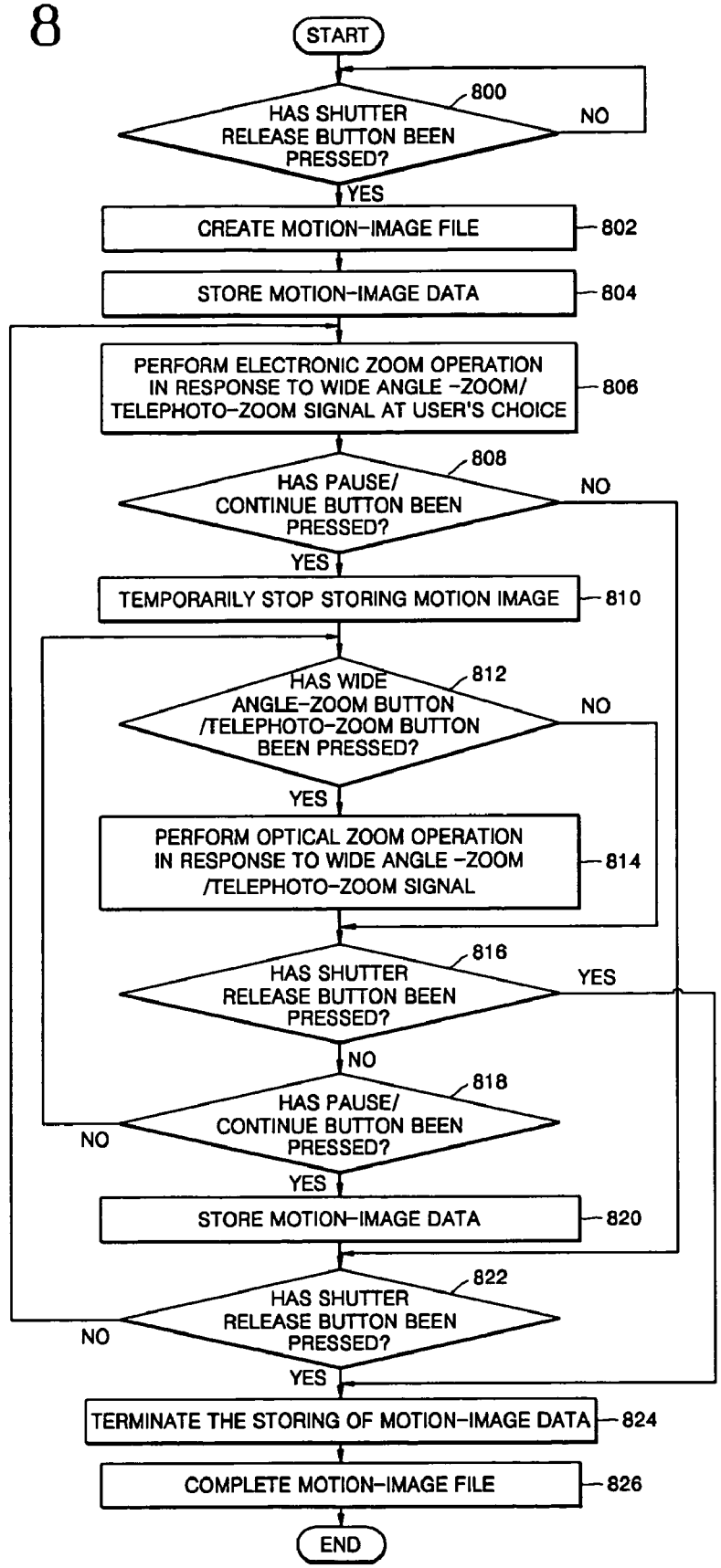
FIG. 8 is a flowchart illustrating a control method used by the digital camera according to a third embodiment of the present invention.
Figure 9:
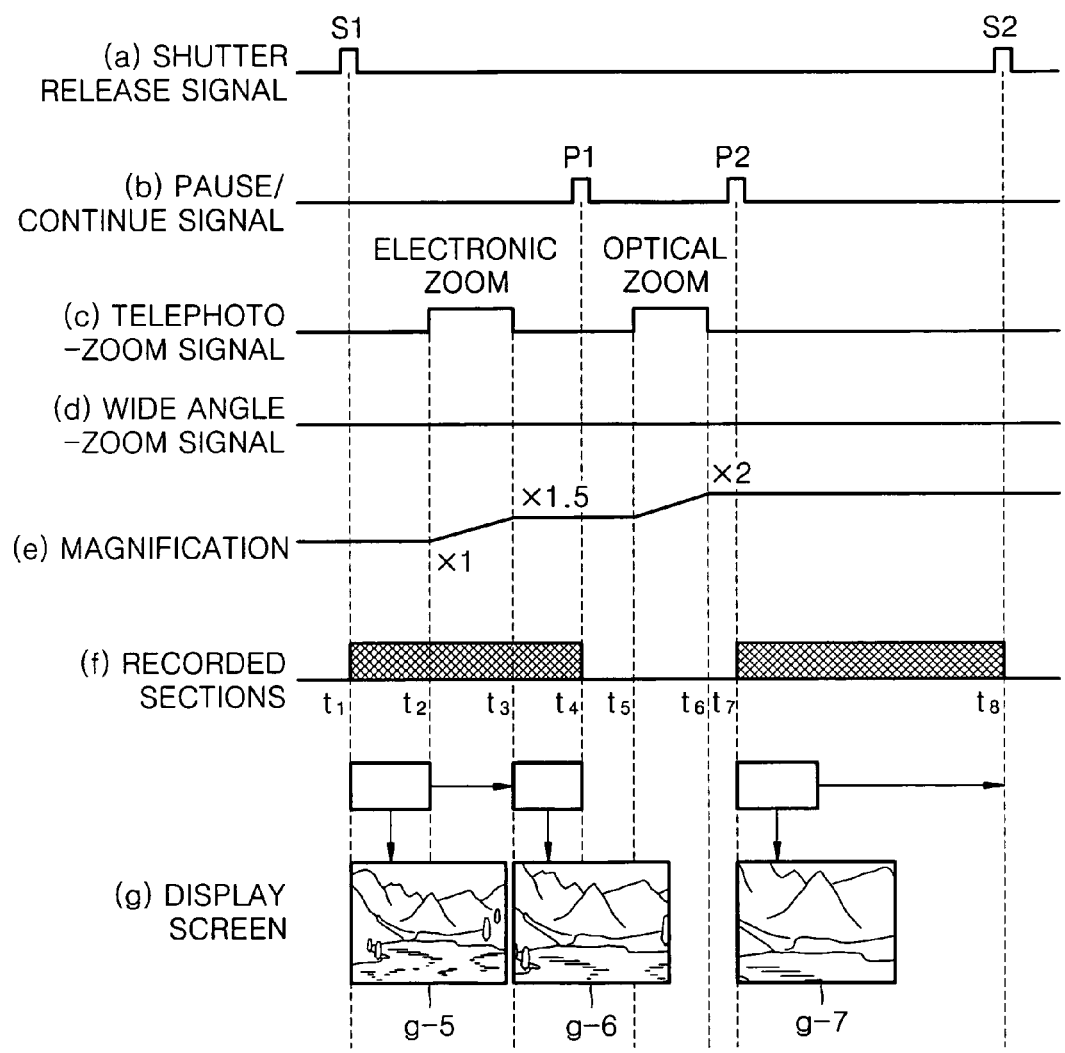
FIG. 9 illustrates timing diagrams and display screens for illustrating the method of FIG. 8 in more detail.

According to a third embodiment illustrated in FIGS. 8 and 9, an electronic zoom operation is performed in the motion image photographing mode $21_{MP}$ to change the angle of view. When the motion image photographing operation is temporarily stopped, the optical zoom operation may be performed. An image is produced at a magnification that combines a magnification obtained after the electronic zoom operation and a magnification obtained after the optical zoom operation.

Figure 10:
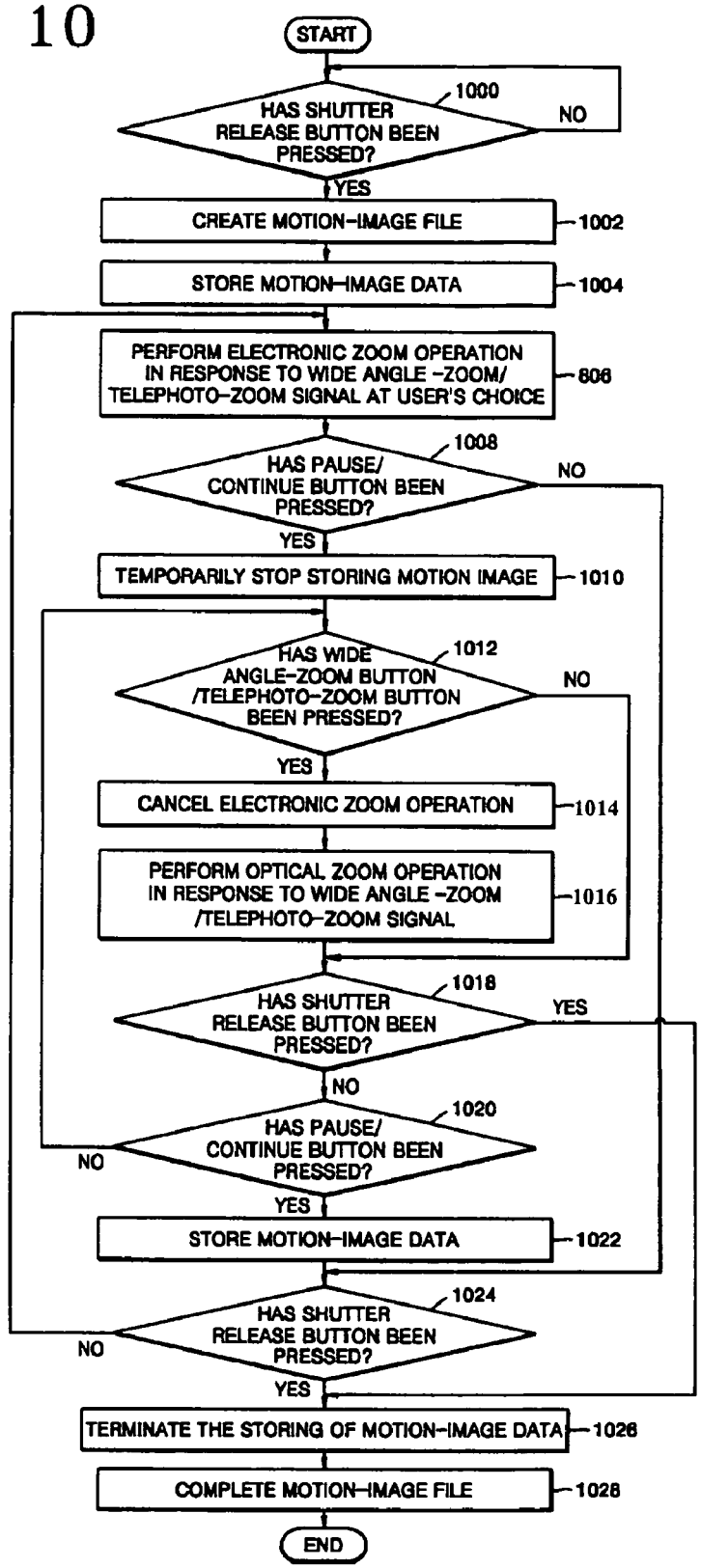
FIG. 10 is a flowchart illustrating a control method used by the digital camera according to a fourth embodiment of the present invention.
Figure 11:
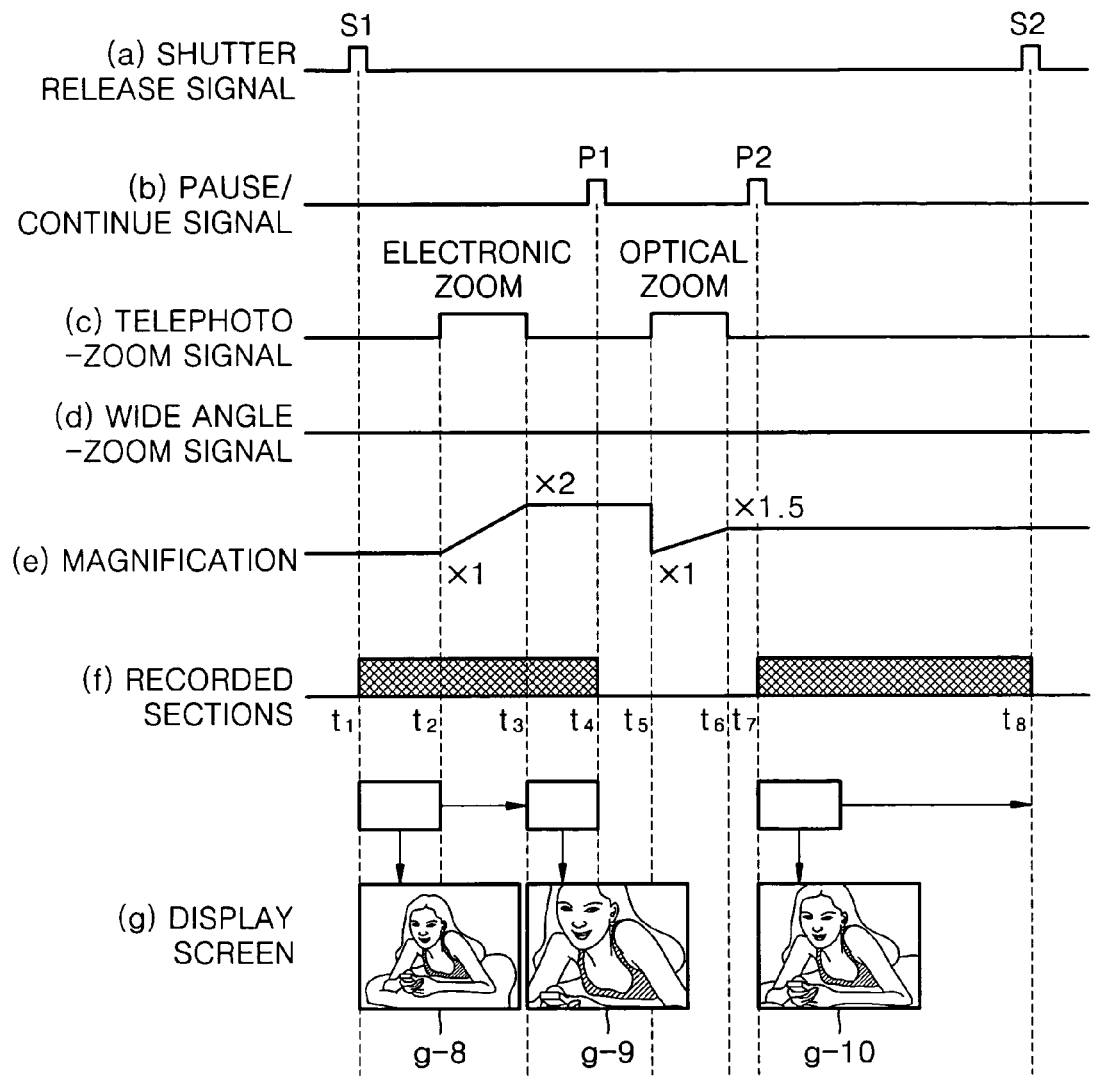
FIG. 11 illustrates timing diagrams and display screens for illustrating the method of FIG. 10 in more detail according to a first embodiment of the present invention.
Figure 12:
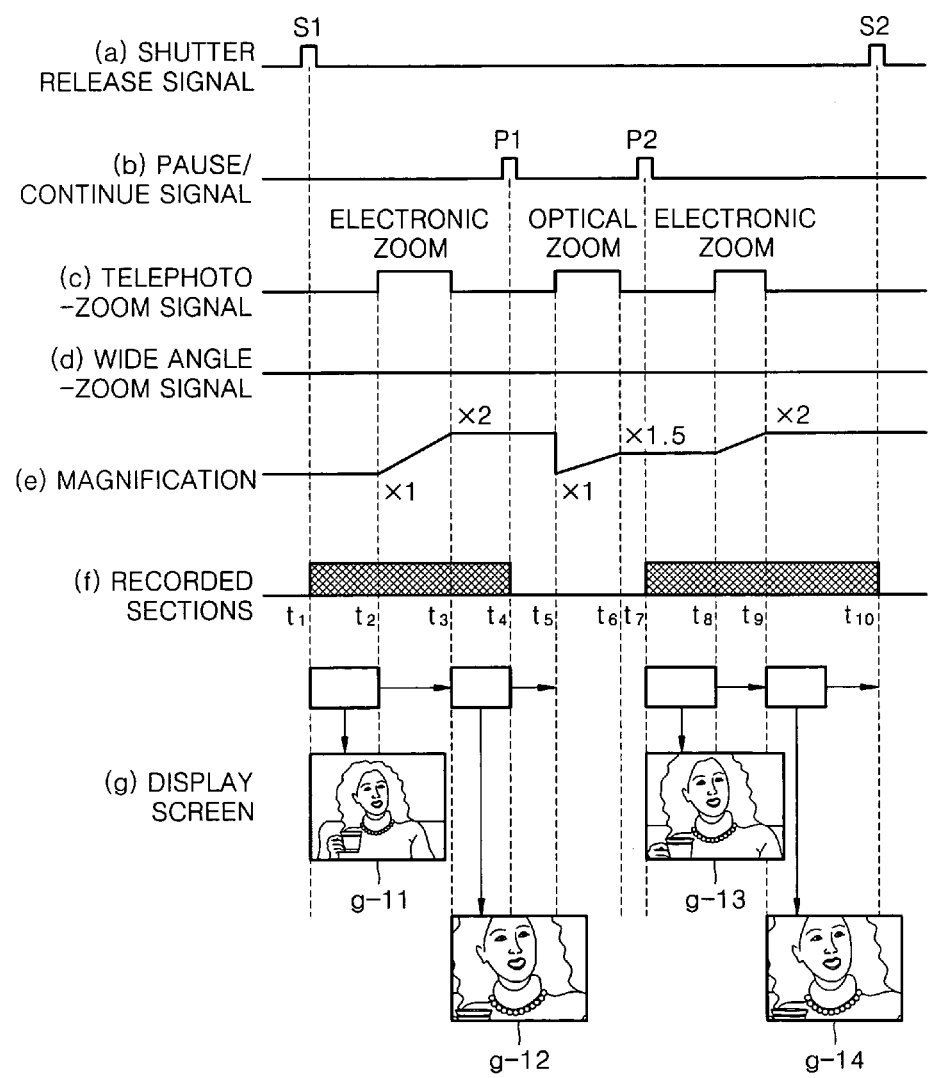
FIG. 12 illustrates timing diagrams and display screens for illustrating the method of FIG. 10 in more detail according to a second embodiment of the present invention.

A fourth embodiment illustrated in FIGS. 10 through 12 is similar to the third embodiment. However, in the fourth embodiment, the electronic zoom operation previously performed is cancelled and only the optical zoom operation is performed to produce an image.

The control method used by the digital camera 1 according to the first embodiment of the present invention will now be described with reference to FIGS. 4 and 5.

To take a photograph of a motion image, the user selects the motion image photographing mode $21_{MP}$ using the mode dial 21. Once in the motion image photographing mode $21_{MP}$, the micro-controller 512 determines whether the shutter release button 11 is pressed (operation 400).

When the user presses the shutter release button 11 (S1 of FIG. 5), the micro-controller 512 transmits this information to the DSP 507. Then, the DSP 507 creates a motion image file in a recording medium, i.e., a memory card (operation 402), and stores motion image data in the motion image file (operation 404). An audio signal generated when the motion image is photographed is input to the microphone MIC of the digital camera 1. The audio processor 513 processes the audio signal from the microphone MIC and stores the processed audio signal in the motion image file under the control of the DSP 507.

To use the optical zoom function while storing the motion image data, the user presses the pause/continue button 25. In this case, the micro-controller 512 determines whether the pause/continue button 25 is pressed (operation 406). If the micro-controller 512 determines that the pause/continue button 25 is not pressed, operation 420 is performed.

If the micro-controller 512 determines that the pause/continue button 25 is pressed (P1 of FIG. 5), the micro-controller 512 transmits this information to the DSP 507, and the DSP 507 temporarily stops storing the motion image data (operation 408).

When the motion image data temporarily stops being stored, the micro-controller 512 determines whether the wide angle-zoom button $27_W$ or the telephoto-zoom button $27_T$ is pressed (operation 410). If the micro-controller 512 determines that the wide angle-zoom button $27_W$ or the telephoto-zoom button $27_T$ is not pressed, operation 414 is performed.

If the micro-controller 512 determines that the wide angle-zoom button $27_W$ or the telephoto-zoom button $27_T$ is pressed, the user performs the optical zoom operation in response to the wide angle-zoom signal or the telephoto-zoom signal (operation 412). When the user presses the wide angle-zoom button $27_W$ or the telephoto-zoom button $27_T$, a signal corresponding to the wide angle-zoom button $27_W$ or the telephoto-zoom button $27_T$ is relayed to a micro-controller 512. The micro-controller 512 controls the lens driver 510, thereby running the zoom motor $M_Z$, which in turn, moves the zoom lens. In other words, when the user presses the wide angle-zoom button $27_W$, the focal length of the zoom lens becomes short, thereby widening the angle of view. When the user presses the telephoto-zoom button $27_T$, the focal length of the zoom lens becomes long, thereby narrowing the angle of view.

After the optical zoom operation is performed, the micro-controller 512 determines whether the shutter release button 11 is pressed again (operation 414). If the user presses the shutter release button 11 again (S2 of FIG. 5), the storing of the motion image data is terminated.

If the user does not press the shutter release button 11 again, the micro-controller 512 determines whether the pause/continue button 25 is pressed again (operation 416). If the micro-controller 512 determines that the pause/continue button 25 is not pressed again, operation 410 is performed.

If the micro-controller 512 determines that the pause/continue button 25 is pressed again (P2 of FIG. 5), the micro-controller 512 transmits this information to the DSP 507, and the DSP 507 stores the motion image data in the motion image file in a state where the magnification is changed by the optical zoom operation (operation 418). The audio processor 513 processes an audio signal from the microphone MIC and stores the processed audio signal in the motion image file under the control of the DSP 507.

Magnification may repeatedly be changed by the optical zoom operation during the motion image photographing operation at the user's choice.

The micro-controller 512 determines whether the shutter release button 11 is pressed again (operation 420). If the micro-controller 512 determines that the shutter release button 11 is not pressed again, operation 406 is performed.

If the micro-controller 512 determines that the shutter release button 11 is pressed again, the micro-controller 512 transmits this information to the DSP 507. Then, the DSP 507 terminates storing the motion image data (operation 422) and completes the motion image file (operation 424).

Figure 4:
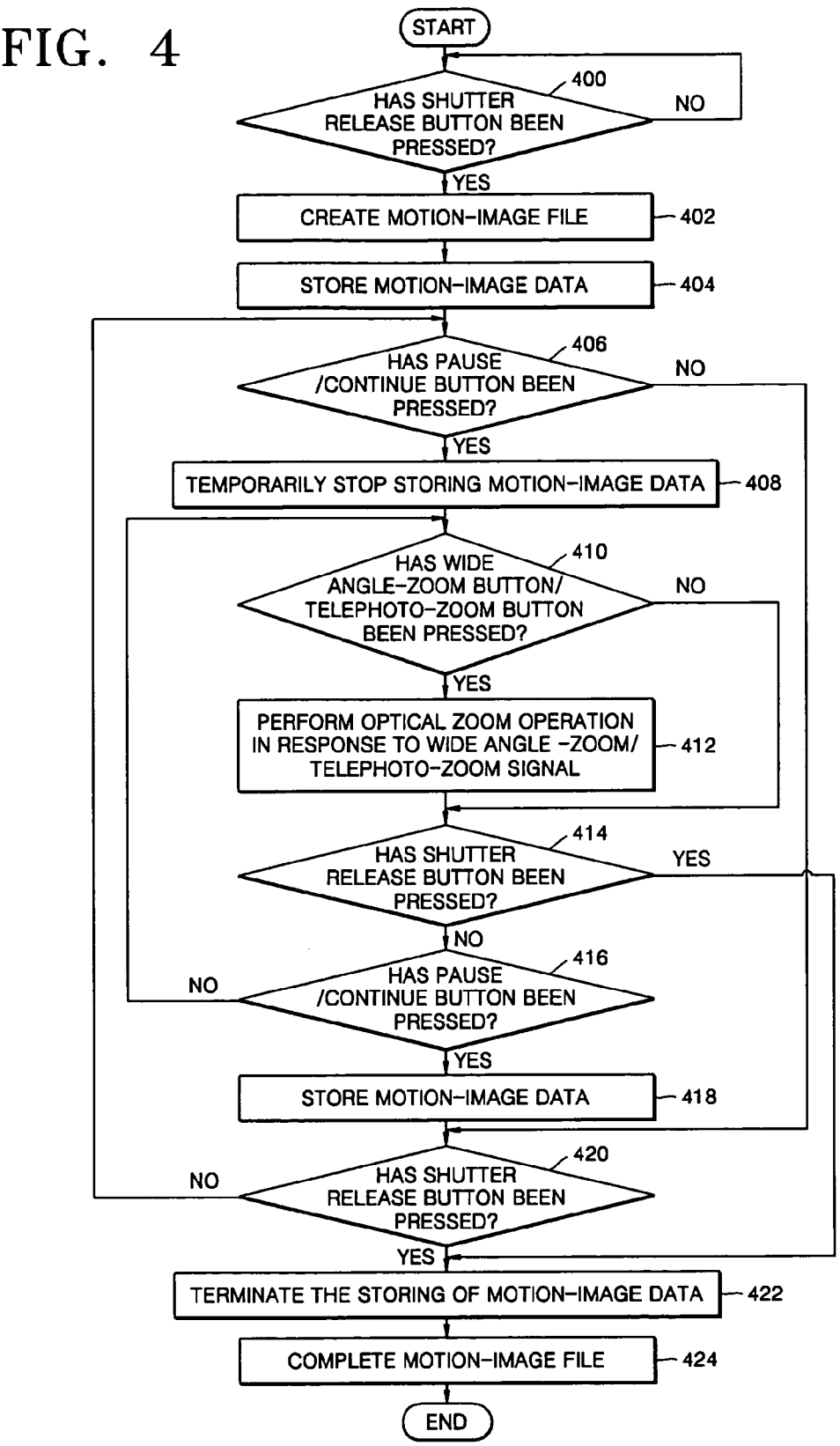
FIG. 4 is a flowchart illustrating a control method used by the digital camera according to a first embodiment of the present invention.
Figure 5:
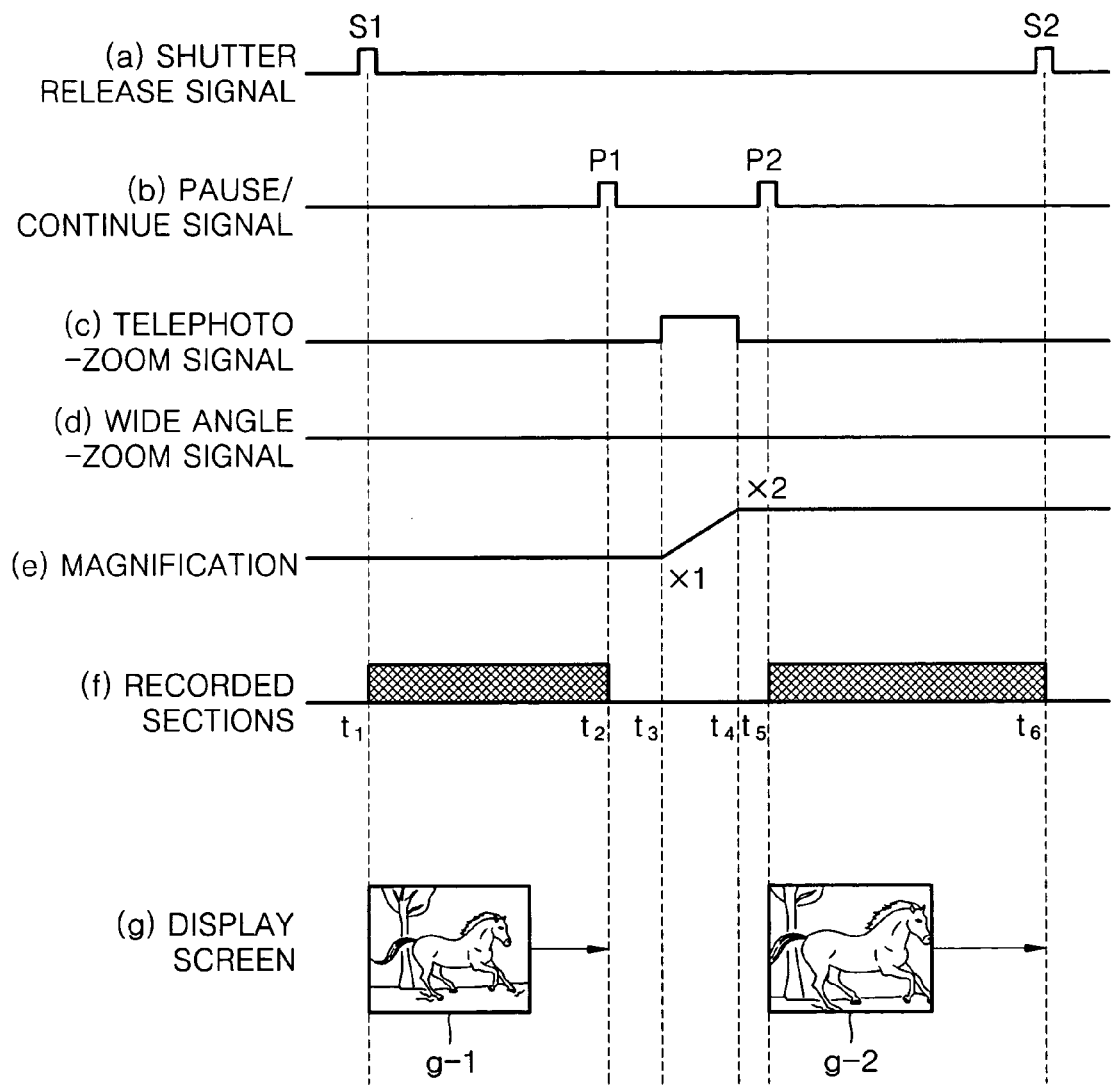
FIG. 5 illustrates timing diagrams and display screens for illustrating the method of FIG. 4 in more detail.

FIG. 5 illustrates timing diagrams and display screens for illustrating the method of FIG. 4 in more detail.

In a section from $t_1$ timing, when a shutter release signal is generated (S1), until $t_2$ timing, when a pause/continue signal is generated (P1), motion image data is stored in a motion image file at a magnification of ×1, for example, g–1.

In a section from $t_2$ timing, when the pause/continue signal is generated (P1), until $t_5$ timing, when the pause/continue signal is generated again (P2), the motion image data temporarily stops being stored. Then, if a telephoto-zoom signal is generated, the magnification is enlarged to the magnification of ×2 by the optical zoom operation.

In a section from $t_5$ timing, when the pause/continue signal is generated again (P2), until $t_6$ timing, when the shutter release signal is generated again (S2), the motion image data is stored at the enlarged magnification of ×2, for example, g–2.

When the motion image data is stored and the shutter release signal is generated again (S2), the storing of the motion image data is terminated and the motion image file is completed. In the motion image file, motion image data in the section from $t_1$ timing to $t_6$ timing excluding the section from $t_2$ timing to $t_5$ timing is stored.

The control method used by the digital camera 1 according to the second embodiment of the present invention will now be described with reference to FIGS. 6 and 7.

After the digital camera 1 enters the motion image photographing mode $21_{MP}$, the micro-controller 512 determines whether the shutter release button 11 is pressed (operation 600).

When the user presses the shutter release button 11 (S1 of FIG. 7), the micro-controller 512 transmits this information to the DSP 507. Then, the DSP 507 creates a motion image file in a recording medium, i.e., a memory card (operation 602), and stores motion image data in the motion image file (operation 604). An audio signal generated when the motion image is photographed is input to the microphone MIC of the digital camera 1. The audio processor 513 processes the audio signal from the microphone MIC and stores the processed audio signal in the motion image file under the control of the DSP 507.

While the motion image data is being stored in the motion image file, the micro-controller 512 determines whether the wide angle-zoom button $27_W$ or the telephoto-zoom button $27_T$ is pressed (operation 606). If the micro-controller 512 determines that the wide angle-zoom button $27_W$ or the telephoto-zoom button $27_T$ is not pressed, operation 622 is performed.

While the motion image data is being stored in the motion image file, if the wide angle-zoom button $27_W$ or the telephoto-zoom button $27_T$ is pressed, the micro-controller 512 determines that the current mode is an optical zoom mode and transmits this information to the DSP 507. The DSP 507 receiving the information temporarily stops storing the motion image data (operation 608).

At the same time, the optical zoom operation is performed in response to a wide angle-zoom signal or a telephoto-zoom signal generated by the user (operation 610). In the present embodiment, the wide angle-zoom signal or the telephoto-zoom signal not only temporarily stops the storing of the motion image data being photographed, but also performs the optical zoom operation.

The DSP 507 initializes time t after the optical zoom operation is performed (operation 612) and counts the time t after the optical zoom operation is performed (operation 614). A counter (not shown) included in the DSP 507 counts the time t after the optical zoom operation is performed.

The DSP 507 determines whether the counted time t exceeds a predetermined period of time, for example, 2 seconds (operation 616). If the DSP 507 determines that the counted time t does not exceed the predetermined period of time, the DSP 507 instructs the micro-controller 512 to determine whether the wide angle-zoom button $27_W$ or the telephoto-zoom button $27_T$ is pressed.

Accordingly, the micro-controller 512 determines whether the wide angle-zoom button $27_W$ or the telephoto-zoom button $27_T$ is pressed (operation 618). If the micro-controller 512 determines that the wide angle-zoom button $27_W$ or the telephoto-zoom button $27_T$ is pressed, operation 610 is performed. If the micro-controller 512 determines that the wide angle-zoom button $27_W$ or the telephoto-zoom button $27_T$ is not pressed, the micro-controller 512 transmits this information to the DSP 507, and the DSP 507 continues to count the time t.

If the DSP 507 determines that the counted time t exceeds the predetermined period of time, the DSP 507 determines that the magnification has been changed by the optical zoom operation and continues to store the motion image data in the motion image file in the state where the magnification has been changed by the optical zoom operation (operation 620). The audio processor 513 processes an audio signal from the microphone MIC and stores the processed audio signal in the motion image file under the control of the DSP 507.

The magnification may repeatedly be changed by the optical zoom operation during the motion image photographing operation at the user's choice.

Next, the micro-controller 512 determines whether the shutter release button 11 is pressed again (operation 622). If the micro-controller 512 determines that the shutter release button 11 is not pressed again, operation 606 is performed.

If the micro-controller 512 determines that the shutter release button 11 is pressed again, the micro-controller 512 transmits this information to the DSP 507, and the DSP 507 stops storing the motion image data (operation 624) and completes the motion image file (operation 626).

FIG. 7 illustrates timing diagrams and display screens for illustrating the method of FIG. 6 in more detail.

In the section from the $t_1$ timing, when the shutter release signal is generated (S1), until the $t_2$ timing, when the optical zoom signal is generated, motion image data is stored in a motion image file at a magnification of ×1, for example, g–3.

In the section from the $t_2$ timing to the $t_3$ timing, during which the optical zoom (telephoto-zoom) signal is generated, the motion image data temporarily stops being stored, and, at the same time, the current magnification (×1) is enlarged to the telephoto-zoom magnification of, for example, ×2.

In the section from the $t_3$ timing to the $t_4$ timing, during which a predetermined period of time is counted, the micro-controller 512, instructed by the DSP 507, determines whether the wide angle-zoom button $27_W$ or the telephoto-zoom button $27_T$ is pressed. In this section, if the wide angle-zoom signal or the telephoto-zoom signal is generated before the predetermined period of time, the optical zoom operation is performed.

In the section from the $t_4$ timing to the $t_5$ timing, during which the optical zoom (telephoto-zoom) signal is generated before the predetermined period of time, the current telephoto-zoom magnification of ×2 is changed to the wide angle-zoom magnification of, for example, ×1.5.

In the section from the $t_5$ timing to the $t_6$ timing, during which the predetermined period of time is counted again, the DSP 507 counts the predetermined period of time, and the micro-controller 512, instructed by the DSP 507, determines whether the wide angle-zoom button $27_W$ or the telephoto-zoom button $27_T$ is pressed. In this section, if the wide angle-zoom signal or the telephoto-zoom signal is not generated before the predetermined period of time, it is determined that the magnification has been changed by the optical zoom operation.

In the section from the $t_6$ timing to the $t_7$ timing, before the shutter release signal is generated again (S2), the motion image data is stored in the motion image file at the changed magnification of ×1.5 after the optical zoom operation.

When the motion image data is stored and the shutter release signal is generated again (S2), the storing of the motion image data is terminated and the motion image file is completed. In the motion image file, motion image data in the section from the $t_1$ timing to the $t_7$ timing excluding the section from the $t_2$ timing to the $t_6$ timing is stored.

The control method used by the digital camera 1 according to the third embodiment of the present invention will now be described with reference to FIGS. 8 and 9.

After the digital camera 1 enters the motion image photographing mode $21_{MP}$, the micro-controller 512 determines whether the shutter release button 11 is pressed (operation 800).

When the user presses the shutter release button 11 (S1 of FIG. 9), the micro-controller 512 transmits this information to the DSP 507. Then, the DSP 507 creates a motion image file in a memory card, i.e., a recording medium (operation 802), and stores motion image data in the motion image file (operation 804). An audio signal generated when the motion image is photographed is input to the microphone MIC of the digital camera 1. The audio processor 513 processes the audio signal from the microphone MIC and stores the processed audio signal in the motion image file under the control of the DSP 507.

While the motion image data is being stored in the motion image file, the motion image data is enlarged or reduced by the electronic zoom operation (operation 806). Since a lens has to be moved in the optical zoom operation, the noise of the zoom motor $M_Z$ may be recorded together with the motion image. However, since an image displayed on the CCD is enlarged or reduced in the electronic operation, the motion image data without the noise of the zoom motor $M_Z$ can be recorded in the motion image file. Therefore, the electronic zoom operation can be performed during the motion image photographing operation.

While the motion image data is being stored in the motion image file, if the wide angle-zoom button $27_W$ or the telephoto-zoom button $27_T$ is pressed, the micro-controller 512 determines that the current mode is an electronic zoom mode and transmits this information to the DSP 507. The DSP 507 receiving the information enlarges the image displayed on the CCD if the wide angle-zoom button $27_W$ is pressed and reduces the image displayed on the CCD if the telephoto-zoom button $27_T$ is pressed.

The magnification may repeatedly be changed by the optical zoom operation during the motion image photographing operation at the user's choice. The audio processor 513 processes an audio signal from the microphone MIC and stores the processed audio signal in the motion image file under the control of the DSP 507.

To use the optical zoom function while storing the motion image data in the motion image file at the magnification changed by the electronic zoom operation, the user presses the pause/continue button 25. In this case, the micro-controller 512 determines whether the pause/continue button 25 is pressed (operation 808). If the micro-controller 512 determines that the pause/continue button 25 is not pressed, operation 822 is performed.

If the micro-controller 512 determines that the pause/continue button 25 is pressed (P1 of FIG. 9), the micro-controller 512 transmits this information to the DSP 507, and the DSP 507 temporarily stops storing the motion image data (operation 810).

When the motion image data temporarily stops being stored, the micro-controller 512 determines whether the wide angle-zoom button $27_W$ or the telephoto-zoom button $27_T$ is pressed (operation 812). If the micro-controller 512 determines that the wide angle-zoom button $27_W$ or the telephoto-zoom button $27_T$ is not pressed, operation 816 is performed.

If the micro-controller 512 determines that the wide angle-zoom button $27_W$ or the telephoto-zoom button $27_T$ is pressed, the micro-controller 512 transmits this information to the DSP 507, and the DSP 507 performs the optical zoom operation in response to the wide angle-zoom signal or the telephoto-zoom signal generated by the user (operation 814). The magnification obtained after the optical zoom operation is a result of multiplying the magnification obtained after the electronic zoom operation by the magnification obtained after the optical zoom operation.

After the optical zoom operation is performed, the micro-controller 512 determines whether the shutter release button 11 is pressed again (operation 816). If the user presses the shutter release button 11 again (S2 of FIG. 9), the storing of the motion image data is terminated.

If the shutter release button 11 is not pressed again, the micro-controller 512 determines whether the pause/continue button 25 is pressed again (operation 818). If the micro-controller 512 determines that the pause/continue button 25 is not pressed again, operation 812 is performed.

If the micro-controller 512 determines that the pause/continue button 25 is pressed again (P2 of FIG. 9), the micro-controller 512 transmits this information to the DSP 507, and the DSP 507 stores the motion image data in the motion image file at a magnification obtained after the magnification of the motion image data after the electronic zoom operation is multiplied by the magnification of the motion image data after the optical zoom operation (operation 820). The audio processor 513 processes an audio signal from the microphone MIC and stores the processed audio signal in the motion image file under the control of the DSP 507.

The magnification may repeatedly be changed by the optical zoom operation during the motion image photographing operation at the user's choice.

The micro-controller 512 determines whether the shutter release button 11 is pressed again (operation 822). If the micro-controller 512 determines that the shutter release button 11 is not pressed again, operation 806 is performed.

If the micro-controller 512 determines that the shutter release button 11 is pressed again, the micro-controller 512 transmits this information to the DSP 507. Then, the DSP 507 terminates storing the motion image data (operation 824) and completes the motion image file (operation 826).

FIG. 9 illustrates timing diagrams and display screens for illustrating the method of FIG. 8 in more detail.

In a section from $t_1$ timing, when the shutter release signal is generated (S1), until $t_2$ timing, when the telephoto-zoom (electronic zoom) signal is generated, motion image data is stored in a motion image file at a magnification of ×1, for example, g–5.

In a section from the $t_2$ timing to $t_3$ timing, during which the telephoto-zoom (electronic zoom) signal is generated, the magnification of the motion image data is changed from ×1 to ×1.5 as the motion image data is stored in the motion image file. In a section from $t_4$ timing, when the pause/continue signal is generated (P1), until $t_7$ timing, when the pause/continue signal is generated again (P2), the motion image data temporarily stops being stored, and when the telephoto-zoom signal is generated, the magnification of the motion image data is changed after the optical zoom operation. In other words, the magnification of the motion image data obtained after the optical zoom operation is the magnification of the motion image data after the electronic zoom operation multiplied by the magnification of the motion image data after the optical zoom operation.

In a section from timing $t_7$, when the pause/continue signal is generated again (P2), until $t_8$ timing when the shutter release signal is generated again (S2), the motion image data is stored in the motion image file at the changed magnification of ×2, such as g–7.

When the motion image data is stored and the shutter release signal is generated again (S2), the storing of the motion image data is terminated and the motion image file is completed. In the motion image file, motion image data for the section from the $t_1$ timing to the $t_8$ timing excluding the section from the $t_4$ timing to the $t_7$ timing is stored.

The control method used by the digital camera 1 according to the fourth embodiment of the present invention will now be described with reference to FIGS. 10 through 12.

After the digital camera 1 enters the motion image photographing mode $21_{MP}$, the micro-controller 512 determines whether the shutter release button 11 is pressed (operation 1000).

When the user presses the shutter release button 11 (S1 of FIGS. 11 and 12), the micro-controller 512 transmits this information to the DSP 507. Then, the DSP 507 creates a motion image file in a memory card, i.e., a recording medium (operation 1002), and stores motion image data in the motion image file (operation 1004). An audio signal generated when the motion image is photographed is input to the microphone MIC of the digital camera 1. The audio processor 513 processes the audio signal from the microphone MIC and stores the processed audio signal in the motion image file under the control of the DSP 507.

While the motion image data is being stored in the motion image file, the motion image data is enlarged or reduced by the electronic zoom operation (operation 1006). The magnification may repeatedly be changed by the electronic zoom operation during the motion image photographing operation at the user's choice. The audio processor 513 processes an audio signal from the microphone MIC and stores the processed audio signal in the motion image file under the control of the DSP 507.

To use the optical zoom function while storing the motion image data in the motion image file at the magnification changed by the electronic zoom operation, the user presses the pause/continue button 25. In this case, the micro-controller 512 determines whether the pause/continue button 25 is pressed (operation 1008). If the micro-controller 512 determines that the pause/continue button 25 is not pressed, operation 1024 is performed.

If the micro-controller 512 determines that the pause/continue button 25 is pressed (P1 of FIGS. 11 and 12), the micro-controller 512 transmits this information to the DSP 507, and the DSP 507 temporarily stops storing the motion image data (operation 1010).

When the motion image data temporarily stops being stored, the micro-controller 512 determines whether the wide angle-zoom button $27_W$ or the telephoto-zoom button $27_T$ is pressed (operation 1012). If the micro-controller 512 determines that the wide angle-zoom button $27_W$ or the telephoto-zoom button $27_T$ is not pressed, operation 1018 is performed.

If the micro-controller 512 determines that the wide angle-zoom button $27_W$ or the telephoto-zoom button $27_T$ is pressed, the DSP 507 cancels the electronic zoom operation and initializes the current magnification to the original magnification (operation 1014).

After the electronic zoom operation is cancelled, the user performs the optical zoom operation in response to the wide angle-zoom or telephoto-zoom signal (operation 1016).

After the optical zoom operation is performed, the micro-controller 512 determines whether the shutter release button 11 is pressed again (operation 1018). If the user presses the shutter release button 11 again (S2 of FIGS. 11 and 12), the storing of the motion image data is terminated.

If the shutter release button 11 is not pressed again, the micro-controller 512 determines whether the pause/continue button 25 is pressed again (operation 1020). If the micro-controller 512 determines that the pause/continue button 25 is not pressed again, operation 1012 is performed.

If the micro-controller 512 determines that the pause/continue button 25 is pressed again (P2 of FIGS. 11 and 12), the micro-controller 512 transmits this information to the DSP 507, and the DSP 507 stores the motion image data in the motion image file at the magnification changed by the optical zoom operation (operation 1022). The audio processor 513 processes an audio signal from the microphone MIC and stores the processed audio signal in the motion image file under the control of the DSP 507.

The magnification may repeatedly be changed by the optical zoom operation during the motion image photographing operation at the user's choice.

The micro-controller 512 determines whether the shutter release button 11 is pressed again (operation 1024). If the micro-controller 512 determines that the shutter release button 11 is not pressed again, operation 1008 is performed.

If the micro-controller 512 determines that the shutter release button 11 is pressed again, the micro-controller 512 transmits this information to the DSP 507. Then, the DSP 507 terminates storing the motion image data (operation 1026) and completes the motion image file (operation 1028).

FIG. 11 illustrates timing diagrams and display screens for illustrating the method of FIG. 10 in more detail according to a first embodiment of the present invention.

In a section from $t_1$ timing, when the shutter release signal is generated (S1), until $t_2$ timing, when the telephoto-zoom (electronic zoom) signal is generated, motion image data is stored in a motion image file at a magnification of ×1, for example, g–8.

In a section from the $t_2$ timing to $t_3$ timing, during which the telephoto-zoom (electronic zoom) signal is generated, the magnification of the motion image data is changed from ×1 to ×2 as the motion image data is stored in the motion image file. In a section from the $t_3$ timing to $t_4$ timing, the motion image data is stored in the motion image file at the changed magnification of ×2 by the electronic zoom operation.

In a section from the $t_4$ timing, when the pause/continue signal is generated (P1), until $t_5$ timing, when the telephoto-zoom (electronic zoom) signal is generated, the motion image data temporarily stops being stored, and the telephoto-zoom (electronic zoom) operation is performed.

In a section from the $t_5$ timing to $t_6$ timing, during which the telephoto-zoom (optical zoom) signal is generated, the magnification (×2) enlarged by the electronic zoom operation is initialized to the original magnification of ×1. Then, the original magnification of ×1 increases to the magnification of ×1.5 in response to the telephoto-zoom (optical zoom) signal.

In a section from the $t_6$ timing, when the telephoto-zoom (optical zoom) signal is generated, until $t_7$ timing, when the pause/continue signal is generated again (P2), the changed magnification of ×1.5 is maintained while the storing of the motion image data is temporarily stopped.

In a section from the $t_7$ timing when the pause/continue signal is generated again (P2) until $t_8$ timing when the shutter release signal is generated again (S2), the motion image data is stored in the motion image file at the changed magnification of ×2, such as g–7.

When the motion image data is stored and the shutter release signal is generated again (S2), the storing of the motion image data is terminated and the motion image file is completed. In the motion image file, motion image data for the section from the $t_1$ timing to the $t_8$ timing excluding the section from the $t_4$ timing to the $t_7$ timing is stored.

FIG. 12 illustrates timing diagrams and display screens for illustrating the method of FIG. 10 in more detail according to a second embodiment of the present invention.

In a section from $t_1$ timing, when the shutter release signal is generated (S1), until $t_2$ timing, when the telephoto-zoom (electronic zoom) signal is generated, motion image data is stored in a motion image file at a magnification of ×1, for example, g–8.

In a section from the $t_2$ timing to $t_3$ timing, during which the telephoto-zoom (electronic zoom) signal is generated, the magnification of the motion image data is changed from ×1 to ×2 as the motion image data is stored in the motion image file. In a section from the $t_3$ timing to $t_4$ timing, the motion image data is stored in the motion image file at the changed magnification of ×2, such as g–9, by the electronic zoom operation.

In a section from the $t_4$ timing when the pause/continue signal is generated (P1), until $t_5$ timing, when the telephoto-zoom (electronic zoom) signal is generated, the motion image data temporarily stops being stored, and the telephoto-zoom (electronic zoom) operation is performed.

In a section from the $t_5$ timing to $t_6$ timing, during which the telephoto-zoom (optical zoom) signal is generated, the magnification (×2) enlarged by the electronic zoom operation is initialized to the original magnification of ×1. Then, the original magnification of ×1 increases to the magnification of ×1.5 in response to the telephoto-zoom (optical zoom) signal.

In a section from the $t_6$ timing, when the telephoto-zoom (optical zoom) signal is generated, until $t_7$ timing, when the pause/continue signal is generated again (P2), the changed magnification of ×1.5 is maintained while the storing of the motion image data is temporarily stopped.

In a section from the $t_7$ timing, when the pause/continue signal is generated again (P2), until $t_8$ timing, when the telephoto-zoom (electronic zoom) signal is generated again, the motion image data is stored in the motion image file at the changed magnification of ×1.5, such as g–13.

In a section from $t_8$ to $t_9$ during which the telephoto-zoom (electronic zoom) signal is generated, the magnification of ×1.5 is changed to the magnification of ×2 as the motion image data is stored in the motion image file.

In a section from $t_9$ when the telephoto-zoom signal is generated until $t_{10}$ when the shutter release signal is generated again (S2), the motion image data is stored in the motion image file at the magnification of ×2 obtained by multiplying the magnification of the motion image data after the electronic zoom operation by the magnification of the motion image data after the optical zoom operation, such as g–14.

When the motion image data is stored and the shutter release signal is generated again (S2), the storing of the motion image data is terminated and the motion image file is completed. In the motion image file, motion image data for the section from the $t_1$ timing to the $t_{10}$ timing excluding the section from the $t_4$ timing to the $t_7$ timing is stored.

As described above, in a control method according to the present invention, noise generated by a digital image processing apparatus can be prevented from being recorded together with motion images during an optical zoom operation in a motion image photographing mode. In addition, motion images with various angles of view can be stored, thereby maximizing user satisfaction.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A control method used by a digital image processing apparatus that records motion image data in a recording medium in a motion image photographing mode, the method comprising:
   (a) creating a motion image file in the recording medium and storing the motion image data in the motion image file when a first primary signal is generated;
   (b) pausing storage of the motion image data when a first secondary signal is generated;
   (c) performing an optical zoom operation when a zoom signal is generated;
   (d) resuming storage of motion image data when a second secondary signal is generated once a predetermined period of time has passed after the optical zoom operation; and
   (e) terminating storing of the motion image data and completing the motion image file when a second primary signal is generated.

2. The method of claim 1, further comprising:
   repeating at least once steps (b), (c), and (d).

3. The method of claim 1, further comprising:
   storing audio data corresponding to the motion image data in the motion image file.

4. The method of claim 1, wherein the first primary signal is generated by a first pressing of a first button on the digital image processing apparatus, and the second primary signal is generated by a second pressing of the first button on the digital image processing apparatus.

5. The method of claim 1, wherein the first primary signal is generated by pressing a first button on the digital image processing apparatus, and the second primary signal is generated by pressing a second button on the digital image processing apparatus.

6. The method of claim 1, wherein the first secondary signal is generated by a first pressing of a first button on the digital image processing apparatus, and the second secondary signal is generated by a second pressing of the first button on the digital image processing apparatus.

7. The method of claim 1, wherein the first secondary signal is generated by pressing a first button on the digital image processing apparatus, and the second secondary signal is generated by pressing a second button on the digital image processing apparatus.

8. A control method used by a digital image processing apparatus that records motion image data in a recording medium in a motion image photographing mode, the method comprising:
   (a) creating a motion image file in the recording medium and storing the motion image data in the motion image file when a first primary signal is generated;
   (b) performing the following steps in response to a zoom signal:
      (i) pausing storage of the motion image data;
      (ii) performing an optical zoom operation; and
      (iii) resuming storage of motion image data once a predetermined period of time has passed after the optical zoom operation; and
   (c) terminating storing of the motion image data and completing the motion image file when a second primary signal is generated.

9. The method of claim 8, further comprising:
   repeating at least once step (b).

10. The method of claim 8, further comprising:
    storing audio data corresponding to the motion image data being stored in the motion image file.

11. The method of claim 8, wherein the first primary signal is generated by a first pressing of a first button on the digital image processing apparatus, and the second primary signal is generated by a second pressing of the first button on the digital image processing apparatus.

12. The method of claim 8, wherein the first primary signal is generated by pressing a first button on the digital image processing apparatus, and the second primary signal is generated by pressing a second button on the digital image processing apparatus.

13. A control method used by a digital image processing apparatus that records motion image data in a recording medium in a motion image photographing mode, the method comprising:
   (a) creating a motion image file in the recording medium and storing the motion image data in the motion image file when a first primary signal is generated;
   (b) upon receiving a zoom signal:
      (i) if the motion image file is presently being stored, performing an electronic zoom operation, and
      (ii) if the motion image file is presently not being stored due to pausing of storage of the motion image data when a first secondary signal is generated by a first pressing of a first button on the digital image processing apparatus, performing an optical zoom operation and resuming storage of the motion image data when a second secondary signal is generated by a second pressing of the first button on the digital image processing apparatus; and
   (c) terminating storing of the motion image data and completing the motion image file when a second primary signal is generated.

14. The method of claim 13, further comprising:
    repeating at least once step (b).

15. The method of claim 13, further comprising:
    storing audio data corresponding to the motion image data in the motion image file.

16. The method of claim 13 wherein the first primary signal is generated by a first pressing of a first button on the digital image processing apparatus, and the second primary signal is generated by a second pressing of the first button on the digital image processing apparatus.

17. The method of claim 13, wherein the first primary signal is generated by pressing a first button on the digital image processing apparatus, and the second primary signal is generated by pressing a second button on the digital image processing apparatus.

18. A digital image processing apparatus comprising:
    means for storing motion image data;
    means for performing pausing storage of the motion image data when an optical zoom operation is performed and resuming storage of the motion image data once a predetermined period of time has passed after the zooming has been completed.

19. The apparatus of claim 17 wherein the digital processing apparatus is a camera.

* * * * *

UNITED STATES PATENT AND TRADEMARK OFFICE
CERTIFICATE OF CORRECTION

PATENT NO.       : 7,616,236 B2                                                   Page 1 of 1
APPLICATION NO. : 11/247940
DATED            : November 10, 2009
INVENTOR(S)      : Sung-cheol Bae It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1010 days.

Signed and Sealed this

Nineteenth Day of October, 2010

David J. Kappos
*Director of the United States Patent and Trademark Office*